(12) United States Patent
Laitinen

(10) Patent No.: US 7,502,607 B2
(45) Date of Patent: Mar. 10, 2009

(54) METHOD FOR PRODUCING AUTHENTICATION INFORMATION

(75) Inventor: Lauri Laitinen, Espoo (FI)

(73) Assignee: Nokia Corporation, Espoo (FI)

( * ) Notice: Subject to any disclaimer, the term of this patent is extended or adjusted under 35 U.S.C. 154(b) by 575 days.

(21) Appl. No.: 11/146,052

(22) Filed: Jun. 7, 2005

(65) Prior Publication Data

US 2006/0135125 A1    Jun. 22, 2006

(30) Foreign Application Priority Data

Dec. 22, 2004   (EP) .................................... 0428084

(51) Int. Cl.
*H04M 1/66* (2006.01)
(52) U.S. Cl. ...................................... 455/411; 455/410
(58) Field of Classification Search .................. 455/410, 455/411

See application file for complete search history.

(56) References Cited

U.S. PATENT DOCUMENTS

2005/0020315 A1* 1/2005 Robertson ................... 455/565

FOREIGN PATENT DOCUMENTS

EP    1 257 143 A1   11/2002
EP    1 343 342 A1    9/2003

* cited by examiner

*Primary Examiner*—CongVan Tran
(74) *Attorney, Agent, or Firm*—Squire Sanders & Dempsey L.L.P.

(57) ABSTRACT

A method in a mobile station for a communication system includes determining if a security module installed in a mobile station is able to produce authentication information for use in a predetermined authentication procedure with a communication system. If not, the method includes generating key material using the security module, and generating the authentication information based on at least the key material for use in the predetermined authentication procedure with the communication system.

44 Claims, 2 Drawing Sheets

METHOD FOR PRODUCING AUTHENTICATION INFORMATION

FIELD OF INVENTION

This invention relates to authentication protocols in communication systems, specifically to production of authentication information.

Technological Background

Authentication protocols of communication systems typically rely on key information stored in a security module, such as a SIM (subscriber identity module) card, in the mobile station, and in a specific network node such as an AuC (authentication center) node. The key information can be a shared secret, or for example a private/public key pair. In systems where a shared secret is used, authentication information is produced on the basis of the shared secret, and typically used in a challenge-response protocol to authenticate the mobile station to the network.

The continuing development of cellular telecommunication systems brings about developments in the authentication procedures used between a mobile station and the network. This inevitably results in interoperation problems with a widely used base of older equipment and new systems.

The generic authentication architecture (GAA) is under standardization for 3GPP (third generation partnership project) system release 6 at the time of writing of this patent application. The 3GPP standards specify certain authentication procedures which require certain capabilities of the security module of a mobile station. However, there is a wide installed base of GSM (global system for mobile communications) technology with large numbers of subscribers, resulting in the problem of how to use older GSM SIM cards in conjunction with the newest authentication procedures, as the SIM cards are unable to provide key material as required by these newest authentication procedures. The inventor envisions that similar problems may arise also later, when a further generation of technology is developed to replace the third generation (3G) technology currently in development.

SUMMARY OF THE INVENTION

Embodiments of the present invention aim to overcome one or several of the above problems.

According to an embodiment, a method in a mobile station of a communication system is provided. The method comprises at least the steps of determining if a security module installed in the mobile station is able to produce authentication information for use in a predetermined authentication procedure with the communication system, and if not, generating key material using the security module, and generating authentication information based at least in part on the key material for use in the predetermined authentication procedure with the communication system.

According to a more specific embodiment, said authentication information is a shared secret.

The ability of a security module to produce authentication information for use in a predetermined authentication procedure can be determined for example by determining the type of said security module. The determination can also be performed for example by determining the type of information stored in the security module as the identity of the subscriber.

The method may further comprise the step of transmitting an indication of the result of the step of determining if a security module installed in the mobile station is able to produce authentication information.

According to another embodiment of the invention, a method in a network element of a communication system is provided. According to this embodiment, the method comprises at least the steps of determining if the security module of a mobile station is able to produce authentication information for use in a predetermined authentication procedure to be performed between the communication system and the mobile station, and if not, generating key material using a method which the security module is able to perform, and generating authentication information at least in part on the basis of the key material for use in the predetermined authentication procedure.

According to a more specific embodiment, said authentication information is a shared secret.

Further, the step of determining if a security module installed in the mobile station is able to produce authentication information comprises the step of receiving an indication from the mobile station.

According to another embodiment, there is provided a mobile station for a communication system, the mobile station having an interface for a security module. According to this embodiment, the mobile station comprises at least means for determining if a security module connected to said interface is able to produce authentication information for use in a predetermined authentication procedure with the communication system, means for causing key material to be generated by the security module and for receiving generated first key material, means for generating authentication information based at least in part on the key material for use in the predetermined authentication procedure with the communication system.

The means for determining can be configured to determine the type of said security module, or for example the type of information stored in the security module as the identity of the subscriber.

The mobile station may further comprise means for transmitting an indication of whether the security module installed in the mobile station is able to produce authentication information for use in the predetermined authentication procedure with the communication system.

According to a further embodiment, there is provided a mobile station for a communication system, the mobile station having an interface for a security module. According to this embodiment, the mobile station comprises at least a controller configured to determine if a security module connected to the interface is able to produce authentication information for use in a predetermined authentication procedure with the communication system, a controller configured to cause key material to be generated by the security module and to receive generated first key material, a key material generator configured to generate authentication information based at least in part on the key material for use in the predetermined authentication procedure with the communication system.

According to a further embodiment, there is provided an authentication system in a network element of a communication system. According to this embodiment, the system comprises at least means for determining if a security module of a mobile station is able to produce authentication information for use in a predetermined authentication procedure to be performed between the communication system and the mobile station, means for generating key material using a method which the security module is able to perform, and means for generating authentication information at least in part on the basis of the key material for use in said predetermined authentication procedure.

According to a still further embodiment, there is provided an authentication system in a network element of a communication system. According to the this embodiment, the system comprises at least a controller configured to determine if a security module of a mobile station is able to produce authentication information for use in a predetermined authentication procedure to be performed between the communication system and the mobile station, a key generator configured to generate key material using a method which the security module is able to perform, and a key generator configured to generate authentication information at least in part on the basis of the key material for use in the predetermined authentication procedure.

According to another embodiment, there is provided a network element of a communication system. According to the this embodiment, the network element comprises means for determining if a security module of a mobile station is able to produce authentication information for use in a predetermined authentication procedure to be performed between the communication system and the mobile station, means for generating key material using a method which the security module is able to perform, and means for generating authentication information at least in part on the basis of the key material for use in said predetermined authentication procedure.

According to another embodiment, there is provided a network element of a communication system. According to the this embodiment, the network element comprises a controller configured to determine if a security module of a mobile station is able to produce authentication information for use in a predetermined authentication procedure to be performed between the communication system and the mobile station, a key generator configured to generate key material using a method which the security module is able to perform, and a key generator configured to generate authentication information at least in part on the basis of the key material for use in the predetermined authentication procedure.

BRIEF DESCRIPTION OF THE DRAWINGS

Embodiments of the present invention will now be described by way of example with reference to the accompanying drawings, in which.

DETAILED DESCRIPTION OF EMBODIMENTS

Figure 1:
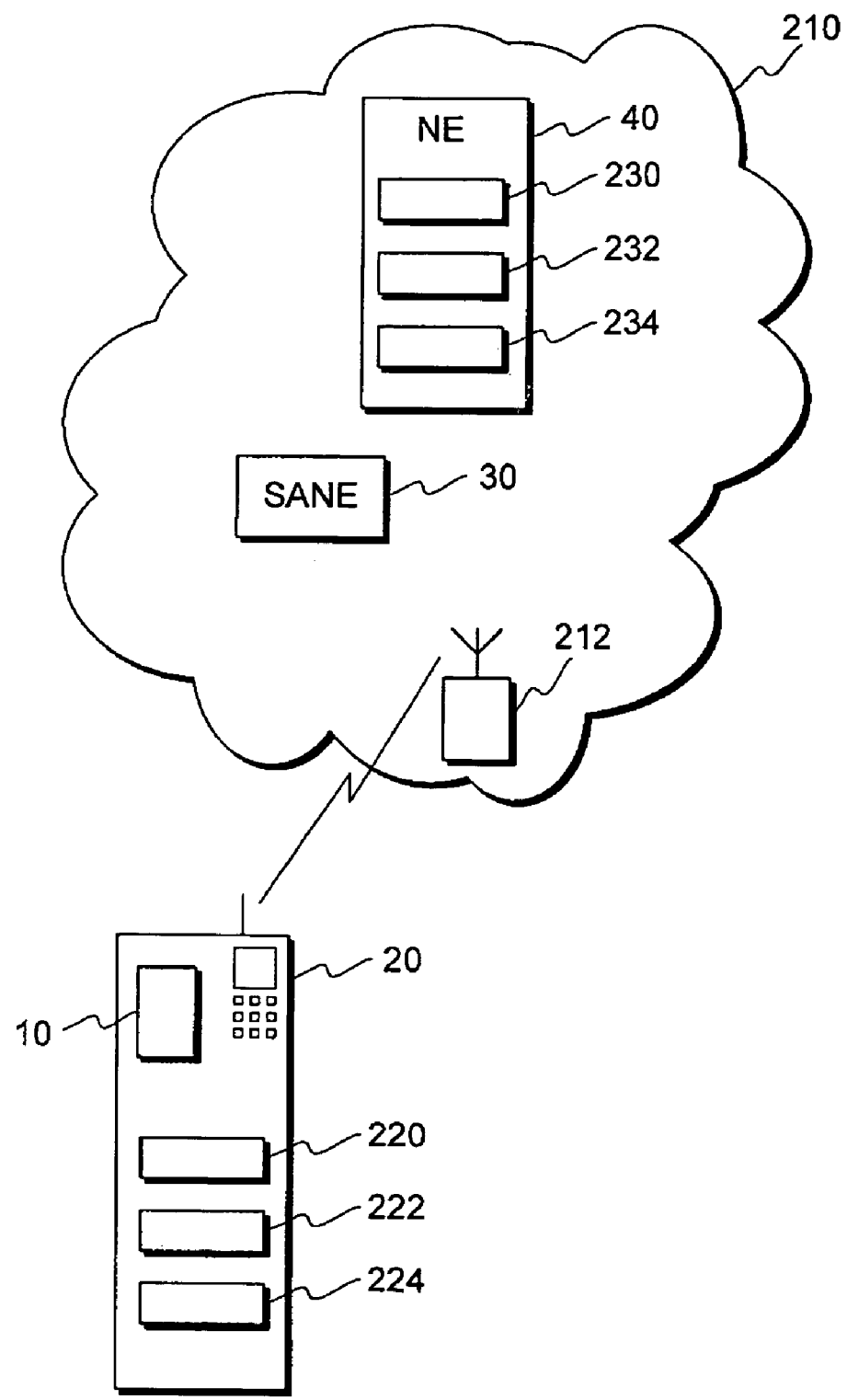
FIG. 1 illustrates a mobile station and a communication system.

FIG. 1 illustrates a mobile station 20 and a security module 10 installed in the mobile station. FIG. 1 also illustrates a communication system 210 such as a cellular telecommunications network, a base station 212 of the communication system, a SANE 30, and a security network element 40.

The mobile station further comprises means 220 for determining if a security module connected to said interface is able to produce authentication information for use in a predetermined authentication procedure with the cellular network, means 222 for causing key material to be generated by said security module and for receiving generated first key material, and means 224 for generating authentication information based at least in part on said key material for use in said predetermined authentication procedure with the cellular network.

Said means 220, 222, and 224 can advantageously be implemented using software program code in a processor of the mobile station.

FIG. 1 also illustrates certain components of the security network element 40. The security network element further comprises means 230 for determining if a security module of a mobile station is able to produce authentication information for use in a predetermined authentication procedure to be performed between the network communication system and the mobile station, means 232 for generating key material using a method which said the security module is able to perform, and means 234 for generating authentication information at least in part on the basis of said the key material for use in said predetermined authentication procedure. Said means 230, 232, and 234 can advantageously be implemented using software program code in a processor of the network element.

Figure 2:
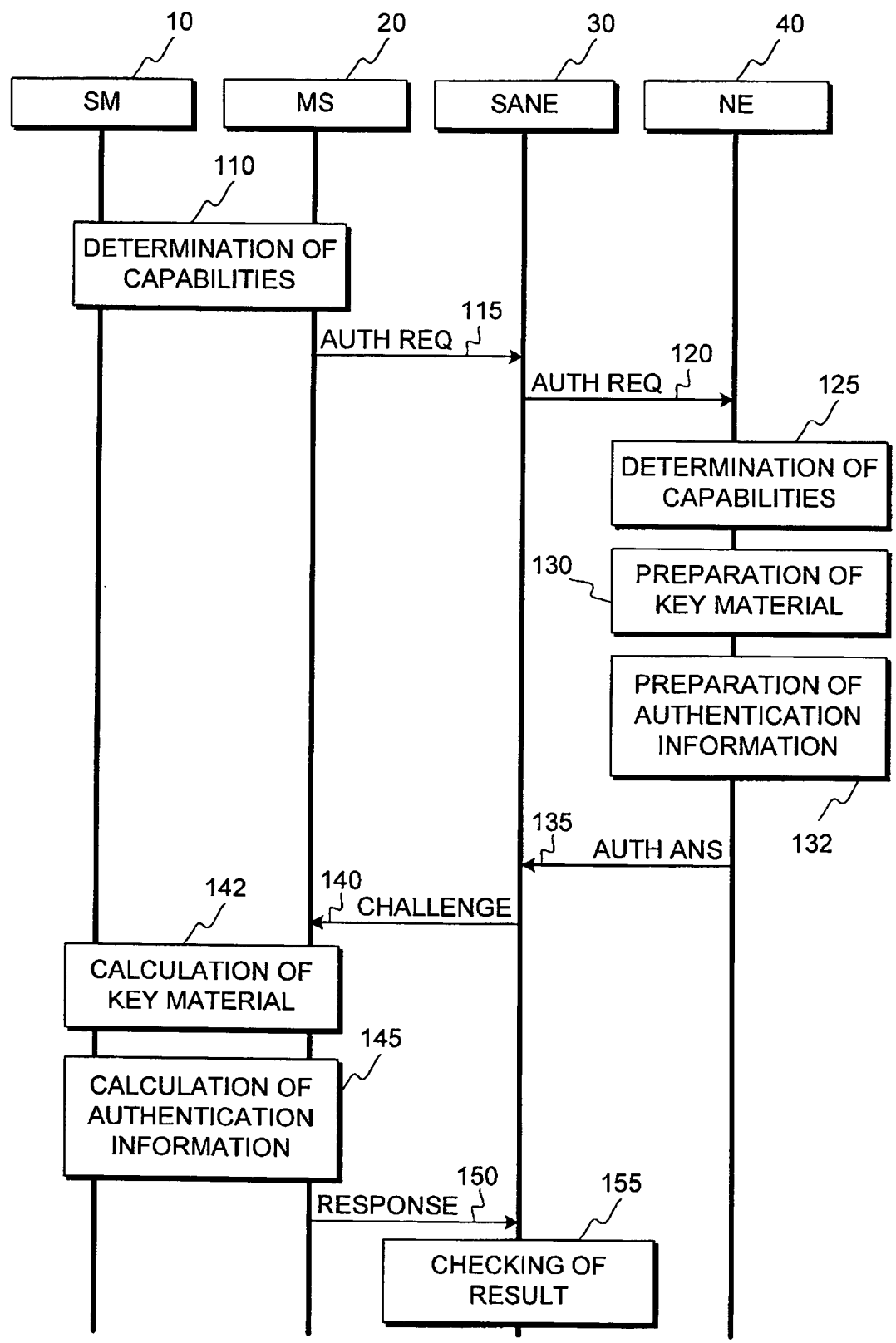
FIG. 2 illustrates a signaling flow chart according to an embodiment.

FIG. 2 shows signaling between and actions of a security module (SM) 10, a mobile station (MS) 20, an authentication network element (SANE) 30, and a security network element (NE) 40. A security application network element (SANE) is a network element that communicates with the mobile station and the network element(s) responsible for storing key information of subscribers, performing a certain authentication protocol. For example, a MSC/VLR (Mobile Switching Center/Visitor Location Register) or a SGSN (Serving GPRS Support Node) can be used as a SANE. For example, in the GAA architecture (general authentication architecture) the Bootstrapping Function (BSF) can be used as a SANE. The security network element 40 (NE) is an element which performs preparation of key material according to the invention. The security network element can comprise a database or other memory means holding key information of subscribers. The security network element can also be implemented external to such a database or other memory means, in which case the security network element can query key information from such a database or other memory means. Such a database can be for example a home location register (HLR) of a GSM system, or a home subscriber server (HSS) of a third generation cellular telecommunication system.

According to FIG. 2, the mobile station (MS) first determines 110 the capabilities of the security module (SM), for example by determining the type of the security module and inferring the capabilities of the security module from its type. Further methods for performing this determination of capabilities of the security module are discussed later in this specification. The mobile station begins an authentication procedure by sending 115 an authentication request to the SANE 30. The mobile station can include an indication of the capabilities of the security module in the authentication request. The SANE 30 sends 120 an authentication information request to the security network element 40. The security network element determines 125 the capabilities of the security module of the mobile station. In such an embodiment of the invention in which the mobile station included an indication of the capabilities of the security module, this determination can be as simple as observing the indication. Further examples of possible methods for determination of the capabilities of the security module are presented later in this application.

In the case that the security module cannot produce authentication information for use in the authentication protocol, the security network element first prepares 130 key material using a method supported by the security module of the mobile station. In this preparation, the security network element uses key information such as a shared secret known both by the security module of the mobile station and the network, obtained from a database of subscriber security information. The security network element prepares 132 authentication information at least in part on the basis of the key material prepared in step 130. The authentication information can be for example in the form of a shared secret suitable for use in the authentication procedure executed by the SANE, i.e. used as a temporary shared secret in the authentication procedure.

Next, the security network element sends 135 the generated authentication information in an authentication information request answer message 135 to the SANE. Based on this authentication information, the SANE transmits 140 a challenge to the mobile station 20.

The mobile station causes the security module to calculate key material in step 142. Based on the calculated key material the mobile station calculates authentication information using a method corresponding to the method used by the network security element, and uses this authentication information to calculate 145 a response to the challenge as required by the authentication procedure. Next, the mobile station transmits 150 the response to SANE, which then checks 155 that the response matches the transmitted challenge according to the authentication protocol in use.

It is to be understood that FIG. 2 represents only a particular example of communication according to the invention, and the signaling can be different in implementations using different types of authentication procedures.

The method steps can also be implemented using software executed on a processor. For example, an embodiment can be implemented by software, which when executed on a processor of a mobile station causes the mobile station to carry out the steps of an embodiment. For example, a further embodiment can be implemented by software, which when executed on a processor of a network element of a communication system causes the network element to carry out the steps of an embodiment. Appropriately adapted computer program code product may be used for implementing the embodiments, when loaded to a processor. The program code product for providing the method steps may be stored on and provided by means of a carrier medium such as a carrier disc, card or tape. A possibility is to download the program code product via a data network.

In a further embodiment of the invention, the inventive functionalities are implemented in the MS and the security network element. In such an embodiment, the SANE need not be modified to work with the invention, nor does it need to be aware of the situation that the security module does not support the authentication procedures performed by the SANE. A mobile station can be adapted to use different types of security elements, and can be programmed to perform new authentication protocols. For example, an old GSM SIM card can be used in a 3G mobile station, and the invention allows the use of the SIM card with authentication protocols that were not envisioned at the time when the SIM card was developed.

The determination of which key generation methods a security module of a mobile station supports can be performed in many different ways. In a further embodiment of the invention, the determination can be made with explicit querying and signaling: the network can send a query to the mobile station, which reports the capabilities of the security module back to the network. The implementation of any such negotiation naturally depends on the particular authentication protocol in use in a network, and what kinds of negotiation extensions, if any, the protocol allows.

In a further embodiment, the determination of which key generation methods a security module of a mobile station supports can be implemented by detecting the type of the security module, and determining the capabilities of the security module based on the type. For example, the security module types which at the time of writing of this patent application can be used in mobile stations according to 3GPP standards are the SIM, USIM, and ISIM. Of these, the SIM is capable of performing key generation according to so called 2G (second generation) GSM standards, while USIM and ISIM type of security modules can perform 3G key generation.

In a further embodiment of the invention, the type of identity information stored in the security module can be used to perform the determination of which key generation methods a security module of a mobile station supports. For example, the type of the security module and therefore the capabilities of the security modules can be inferred from whether the security module has an IMSI (International mobile subscriber identity) or an IMPI (IPMultimedia Private Identity) stored as the identity of the subscriber.

In a further embodiment, the capabilities of the security module are inferred from the detected type of the security module, where the type detection is made on the basis more than one piece of information stored in the security module.

The capabilities of the security module can also determined by obtaining information regarding the capabilities from a database in the communication system.

In a further embodiment, the security network element can have a predefined ordered list of possible authentication information generation methods, which are tried in order, until an authentication with the security module of the mobile station succeeds. The network security element can also have a plurality of such lists, from which one can be selected for use on the basis of a parameter, such as location of the mobile station, or known attributes of the security module.

In cases where a true shared secret is not available, a pseudo-shared secret for use in place of a true shared secret can be generated based on other shared data, i.e. data that is known by both the mobile station and the network. This pseudo-shared secret can then be used to generate key information for use in authentication. Such shared data can be for example setting flags and control information stored in the terminal side that is known also by an operator. In general, any data that is set to the mobile station in configuration procedures and is not sent over the air interface in normal communication can be used as such shared data. This shared data can also be user specific shared data stored in a user specific subscriber module or terminal specific shared data based on used ME's properties (e.g. IMEI).

The invention has several advantages. One of the advantages is that the invention allows the use of older security modules already in use by large numbers of subscribers in networks which use authentication procedures not supported by these older security modules. The invention also allows the use of the same authentication procedure regardless of whether the security module of a mobile station supports the procedure or not.

It is noted that while the preceding description illustrates various embodiments of the invention within a 3G cellular telecommunications system, the invention is not limited to a so called 3G cellular system, but can be implemented in different types of cellular telecommunication systems as well.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   determining in a mobile station for a communication system, whether a security module installed in the mobile station is able to produce authentication information for use in a predetermined authentication procedure with a communication system using key material as required by the predetermined authentication procedure, and
   when the security module installed in the mobile station is not able to produce such authentication information,
   generating, in the mobile station, key material using a key generation method the security module does support, and
   generating, in the mobile station, the authentication information based on at least said generated key material for use in said predetermined authentication procedure with the communication system.

2. A method according to claim 1, wherein the authentication information comprises a shared secret.

3. A method according to claim 1, wherein the determining comprises determining a type of said security module.

4. A method according to claim 1, wherein the determining comprises determining a type of information stored in the security module as an identity of a subscriber.

5. A method according to claim 1, further comprising:
   transmitting an indication of a result of the determining.

6. A method, comprising:
   determining in a network element of a communication system, whether a security module of a mobile station is able to produce authentication information for use in a predetermined authentication procedure to be performed between a communication system and the mobile station using key material as required by the predetermined authentication procedure, and
   when the security module of the mobile station is not able to produce such authentication information,
   generating, in said network element, key material using a method that said security module is able to perform, and
   generating, in said network element, the authentication information based on at least the generated key material for use in said predetermined authentication procedure.

7. A method according to claim 6, wherein the authentication information comprises a shared secret.

8. A method according to claim 6, wherein the determining comprises determining a type of said security module.

9. A method according to claim 6, wherein the determining comprises determining a type of information stored in the security module as an identity of a subscriber.

10. A method according to claim 6, wherein the determining comprises receiving an indication from said mobile station.

11. A mobile station, comprising:
    determining means for determining whether a security module connected to an interface of the mobile station is able to produce authentication information for use in a predetermined authentication procedure with a communication system using key material as required by the predetermined authentication procedure,
    causing means for causing key material to be generated by the security module using a key generation method the security module does support, when the security module is not able to produce such authentication information, and for receiving generated first key material, and
    generating means for generating the authentication information based on at least the generated key material for use in said predetermined authentication procedure with the communication system.

12. A mobile station according to claim 11, wherein the generating means is configured to generate a shared secret.

13. A mobile station according to claim 11, wherein the determining means is configured to determine a type of the security module.

14. A mobile station according to claim 11, wherein the determining means is configured to determine a type of information stored in said security module as an identity of a subscriber.

15. A mobile station according to claim 11, further comprising:
    transmitting means for transmitting an indication of whether the security module installed in the mobile station is able to produce the authentication information for use in the predetermined authentication procedure with the communication system.

16. A mobile station, comprising:
    a first controller configured to determine whether a security module connected to an interface of the mobile station is able to produce authentication information for use in a predetermined authentication procedure with a communication system using key material as required by the predetermined authentication procedure,
    a second controller configured to cause key material to be generated by the security module using a key generation method the security module does support, when the security module is not able to produce such authentication information, and to receive generated first key material,
    a key material generator configured to generate the authentication information based on at least said generated key material for use in the predetermined authentication procedure with the communication system.

17. A mobile station according to claim 16, wherein the key material generator is configured to generate a shared secret.

18. A mobile station according to claim 16, wherein the first controller is configured to determine a type of the security module.

19. A mobile station according to claim 16, wherein the first controller is configured to determine a type of information stored in the security module as an identity of a subscriber.

20. A mobile station according to claim 16, further comprising:
    a transmitter configured to transmit an indication of whether the security module installed in the mobile station is able to produce the authentication information for use in the predetermined authentication procedure with the communication system.

21. An authentication system in a network element, comprising:
    determining means for determining whether a security module of a mobile station is able to produce authentication information for use in a predetermined authentication procedure to be performed between a communication system and the mobile station using key material as required by the predetermined authentication procedure, first generating means for generating key material using a method which the security module is able to perform when the security module is not able to produce such authentication information, and second generating means for generating the authentication information based on at least the generated key material for use in said predetermined authentication procedure.

22. An authentication system according to claim 21, wherein the second generating means is configured to generate a shared secret.

23. An authentication system according to claim 21, wherein the determining means is configured to determine a type of the security module.

24. An authentication system according to claim 21, wherein the determining means is configured to determine a type of information stored in the security module as an identity of a subscriber.

25. An authentication system according to claim 21, wherein the determining means is configured to receive an indication from the mobile station.

26. An authentication system in a network element, comprising:

a controller configured to determine whether a security module of a mobile station is able to produce authentication information for use in a predetermined authentication procedure to be performed between a communication system and the mobile station using key material as required by the predetermined authentication procedure, a first key generator configured to generate key material using a method that the security module is able to perform when the security module is not able to produce such authentication information, and a second key generator configured to generate the authentication information based on at least said generated key material for use in said predetermined authentication procedure.

27. An authentication system according to claim 26, wherein the second key generator is configured to generate a shared secret.

28. An authentication system according to claim 26, wherein the controller is configured to determine a type of the security module.

29. An authentication system according to claim 26, wherein the controller is configured to determine a type of information stored in the security module as an identity of a subscriber.

30. An authentication system according to claim 26, wherein the controller is configured to receive an indication from the mobile station.

31. A network element, comprising:

determining means for determining whether a security module of a mobile station is able to produce authentication information for use in a predetermined authentication procedure to be performed between a communication system and the mobile station using key material as required by the predetermined authentication procedure, first generating means for generating key material using a method that the security module is able to perform when the security module is not able to produce such authentication information, and second generating means for generating the authentication information based on at least the generated key material for use in said predetermined authentication procedure.

32. A network element according to claim 31, wherein the second generating means is configured to generate a shared secret.

33. A network element according to claim 31, wherein the determining means is configured to determine a type of the security module.

34. A network element according to claim 31, wherein the determining means is configured to determine a type of information stored in the security module as an identity of a subscriber.

35. A network element according to claim 31, wherein the determining means is configured to receive an indication from the mobile station.

36. A network element, comprising:

a controller configured to determine whether a security module of a mobile station is able to produce authentication information for use in a predetermined authentication procedure to be performed between the communication system and the mobile station using key material as required by the predetermined authentication procedure, a first key generator configured to generate key material using a method that the security module is able to perform when the security module is not able to produce such authentication information, and a second key generator configured to generate the authentication information based on at least said generated key material for use in said predetermined authentication procedure.

37. A network element according to claim 36, wherein the second key generator is configured to generate a shared secret.

38. A network element according to claim 36, wherein the controller is configured to determine a type of the security module.

39. A network element according to claim 36, wherein the controller is configured to determine a type of information stored in the security module as an identity of a subscriber.

40. A network element according to claim 36, wherein the controller is configured to receive an indication from the mobile station.

41. A computer program embodied on a computer-readable medium, the computer program configured to control a processor to perform:

determining whether a security module installed in a mobile station is able to produce authentication information for use in predetermined authentication information for use in predetermined authentication procedure with a communication system using key material as required by the predetermined authentication procedure, and when the security module installed in the mobile station is not able to produce such authentication information, generating key material using a key generation method the security module does support, and generating the authentication information based on at least said generated key material for use in said predetermined authentication procedure with the communication system.

42. A computer program embodied on a computer-readable medium, the computer program configured to control a processor to perform:

determining whether a security module of a mobile station is able to produce authentication information for use in a predetermined authentication procedure to be performed between a communication system and the mobile station using key material as required by the predetermined authentication procedure, and when the security module of the mobile station is not able to produce such authentication information, generating key material using a method that said security module is able to perform, and generating the authentication information based on at least the generated key material for use in said predetermined authentication procedure.

43. A method according to claim 1, wherein the generating is generating key material using the security module.

44. A computer program according to claim 41, wherein the generating is generating key material using the security module.

* * * * *